Sept. 28, 1971    L. H. LEONARD, JR    3,608,326

ABSORPTION REFRIGERATION SYSTEM

Filed March 18, 1970    2 Sheets-Sheet 1

INVENTOR.
LOUIS H. LEONARD, JR.
BY Frank N. Decker Jr.
ATTORNEY

United States Patent Office 3,608,326
Patented Sept. 28, 1971

---

3,608,326
ABSORPTION REFRIGERATION SYSTEM
Louis H. Leonard, Jr., De Witt, N.Y., assignor to
Carrier Corporation, Syracuse, N.Y.
Filed Mar. 18, 1970, Ser. No. 20,775
Int. Cl. F25b 15/06
U.S. Cl. 62—101                5 Claims

ABSTRACT OF THE DISCLOSURE

An absorption refrigeration system employing in combination a flash-type solution heat exchanger and a sensible-type solution heat exchanger, the flash-type heat exchanger incorporating therein a plurality of scoop pumps providing relatively high velocity forced flow of both strong and weak absorbent solution to and from the generator, to provide good solution heat transfer efficiencies within the system. The strong and weak solutions are pumped in counterflow relation through a sensible-type heat exchanger communicating with the flash-type heat exchanger. The sensible-type heat exchanger may be located interiorly or exteriorly of the flash-type heat exchanger.

BACKGROUND OF THE INVENTION

This invention relates to an absorption refrigeration system which includes a generator, a condenser, an evaporator, an absorber, and a solution heat exchanger located to pass in counterflowing relation relatively hot strong absorbent solution from the generator to the absorber and relatively cool weak solution from the absorber to the generator.

The weak solution side of conventional solution heat exchangers generally exhibits a satisfactorily high heat transfer coefficient because of the relatively high solution velocity but the strong solution side may exhibit a marginal coefficient because of the relatively low velocities produced by gravity solution flow. One possible answer would be to employ a centrifugal pump in the line between the heat exchanger and absorber; however, centrifugal pumps require that a positive head exist on the pump inlet in order to force liquid into the impeller eye. Consequently, the use of centrifugal pumps may impose physical limitations on the system in order to satisfy the solution head requirements. Also, the use of centrifugal pumps for pumping strong solution through the heat exchanger adds significant cost to the system. Furthermore, the centrifugal pump is not entirely satisfactory for pumping hot strong solution, because the strong solution flashes in the pump causing severe cavitation damage, unless means are provided to dilute the strong solution with weak solution or refrigerant, which is not always desirable. The use of single and multiple stage flash heat exchangers has been previously proposed, because such heat exchangers offer certain advantages over sensible heat exchangers alone.

SUMMARY OF THE INVENTION

It has been discovered in accordance with this invention that further and unexpected improvements in temperature approach can be achieved by combining a relatively small sensible heat exchanger with a rotary flash heat exchanger in a special way for exchanging heat between the strong and weak solutions in an absorption refrigeration system, while simultaneously satisfying all of the solution pumping requirements of the system. Accordingly, there is provided an absorption refrigeration machine having solution heat exchange apparatus embodying a flash-type solution heat exchanger in direct communication with a relatively small sensible-type solution heat exchanger. The flash-type solution heat exchanger comprises a hermetic housing containing therewithin a pair of rotatable pans or troughs, one of which provides a flash chamber and the other, an absorber chamber. Leading into the flash chamber is a discharge nozzle communicating with the generator and feeding to the flash chamber relatively hot strong absorbent solution which flash cools therein, the flash vapors being absorbed by relatively cool weak solution in the absorber chamber, thereby warming the weak solution. The flash cooled strong solution in the flash chamber is scoop pumped into a sensible-type heat exchanger through which it passes in counterflow relation with warmed weak solution which is scoop pumped from the absorber chamber by rotation of the pans therein. The cooled strong solution is then scoop pumped to the absorber and the warmed weak solution is then scoop pumped to the generator.

The sensible heat exchanger may be located exteriorly or interiorly of the flash-type solution heat exchanger, but in either case, by providing forced flow through the sensible heat exchanger to and from the generator the thermal efficiency of the flash-type solution heat exchanger is markedly improved.

DESCRIPTION OF THE PREFERRED EMBODIMENT

In accordance with a preferred embodiment of this invention, there is provided an absorption refrigeration system which utilizes water as a refrigerant and an aqueous solution of lithium bromide as an absorbent. A suitable compound, such as octyl alcohol (2-ethyl-n-hexanol), may be added to the solution for heat transfer promotion, and suitable corrosion inhibitors may also be used. "Strong solution" as referred to herein is a concentrated solution of lithium bromide, which is strong in absorbing power. "Weak solution" is a dilute solution of lithium bromide which is weak in absorbing power.

Figure 1:
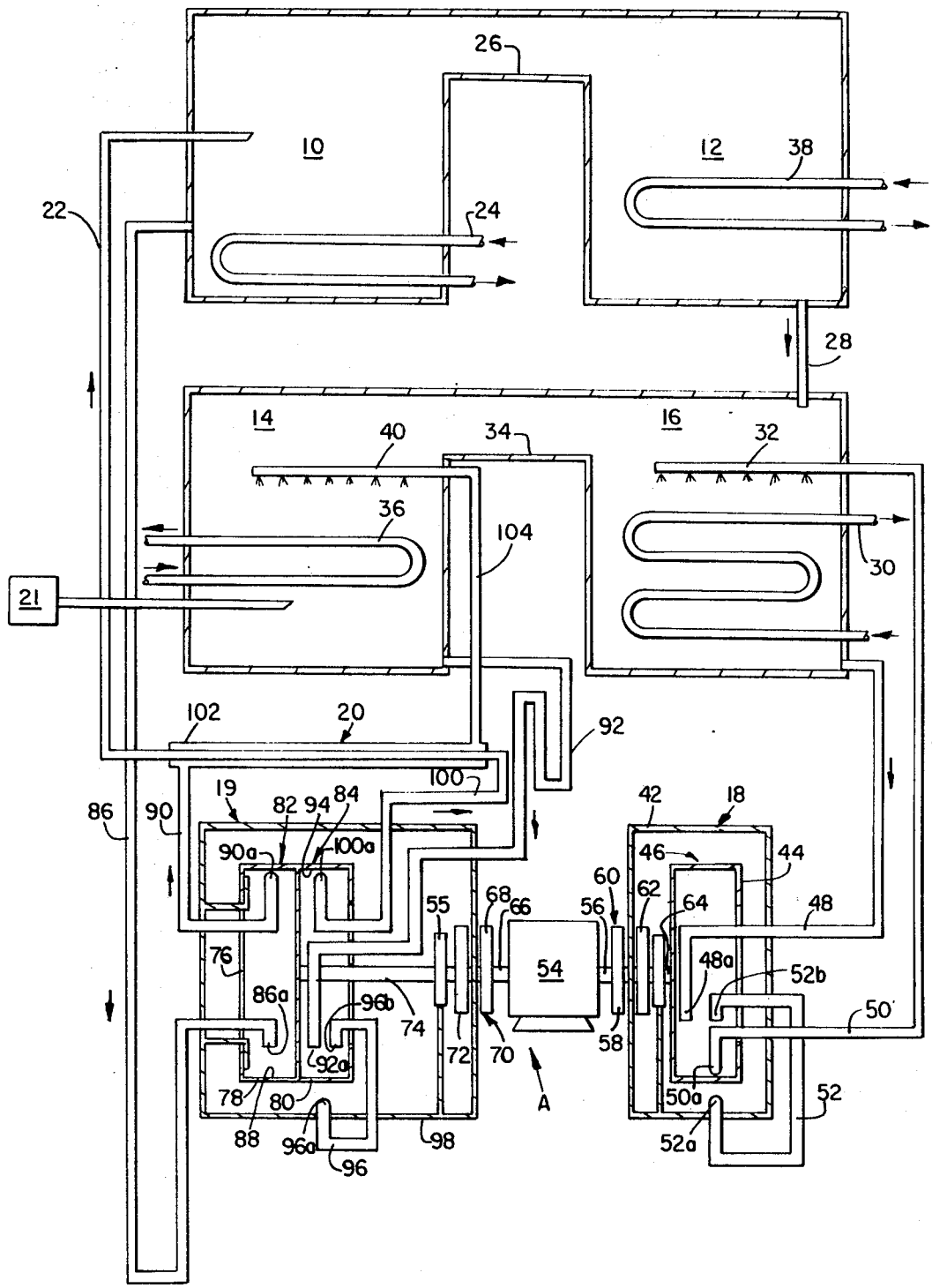
FIG. 1 is a schematic flow diagram, partially in cross-section, of an absorption refrigeration system embodying a solution heat exchange apparatus in accordance with this invention.

Referring to FIG. 1, there is shown an absorption refrigeration system comprising a generator 10, a refrigerant condenser 12, an absorber 14, an evaporator 16, and solution heat exchange apparatus generally designated by the legend A and which includes a rotary flash-type solution heat exchanger 19, and a sensible-type solution heat exchanger 20. A purge unit 21 may be employed to remove relatively noncondensible vapors from the system.

Generator 10 comprises a boiler to which weak absorbent solution is directed from conduit means 22. The solution in generator 10 is heated by a heat source such as steam pipe 24 and boiled therein to concentrate the absorbent solution by vaporizing refrigerant therefrom. Other types of generators employing a combustible gas may be utilized instead of the arrangement shown.

Water vapor boiled off from the weak solution in generator 10 passes through passage 26, is condensed in condenser 12 and is directed by conduit means 28 to evaporator 16. A heat exchanger 30, through which a heat transfer medium to be cooled flows, is located in the evaporator. Spray header 32 is disposed in the evaporator to wet the surface of the coil 30 with liquid refrigerant circulated from the evaporator tank.

Absorbent solution in absorber 14 absorbs water vapor formed in evaporator 16 which passes through passage 34 connecting the evaporator and absorber. Heat exchangers 36 and 38, connected to a source of cooling medium such as water, are located in the absorber 14 and condenser 16, respectively, to remove waste heat from the refrigeration cycle. Also located in the absorber 14 is spray header 40 which serves to wet the surfaces of heat exchanger 36 with absorbent solution.

Refrigerant circulation pump 18 comprises a hermetic housing 42 supporting therewithin pan 44 forming a part of scoop pump 46 which also includes discharge nozzle 48a of conduit means 48 leading from evaporator 16 and directing to the interior of pan 44 liquid refrigerant. Scoop pump 46 incorporates eduction orifice 50a of conduit means 50 leading to spray header 32 and discharging liquid refrigerant over heat exchanger 30. A pickup scoop 52 having an eduction orifice 52a and discharge nozzle 52b is provided to transfer into the pan 44 any liquid refrigerant which accumulates in the bottom of the hermetic housing 42. Pan 44 is rotatively driven by motor means 54 suitably supported by fixed bearing structure 55 and having shaft means 56 connected to coupling member 58 of magnetic drive means 60, the magnetic drive means 60 also including a matching coupling member 62 to which is secured a stub shaft 64.

The motor means 54 at its opposite end supports shaft means 66 connected to coupling member 68 of magnetic drive means 70. Drive means 70 includes a matching coupling member 72 secured to shaft means 74 on which is mounted a pair of rotatable troughs or pans 78 and 80 connected in back-to-back relation by partition member 76. The pans 78 and 80 form a part of a pair of scoop pumps 82 and 84, the pump 82 having a discharge nozzle 86a of conduit means 86 leading from generator 10 to transfer into the interior of the pan 78 strong relatively hot absorbent solution for flash cooling in rotatable strong solution flash chamber 88 provided by pan or trough 78. The scoop pump 82 further includes an eduction orifice 90a of conduit means 90 leading to sensible-type solution heat exchanger 20.

Scoop pump 84 includes, in addition to the rotatable pan 80, discharge nozzle 92a of conduit means 92 for directing relatively cool weak absorbent solution from absorber 14 to rotatable absorber or weak solution chamber 94 defined by pan 80 and partition member 76. The scoop pump 84 also has a pick-up scoop 96 with an eduction orifice 96a and discharge nozzle 96b for transferring to absorber chamber 94 any absorbent solution which drains or splashes into the bottom of hermetic housing 98 during machine shutdown.

Weak solution is discharged into absorber chamber 94 through nozzle means 92a of conduit means 92 leading from absorber 14. Eduction orifice 100a of conduit means 100 passes the weak solution to sensible-type solution heat exchanger 20. The weak solution so transferred is warmer and more dilute than it was when discharged into the chamber 94, having absorbed flash vapors resulting from flash cooling of relatively hot strong solution in rotatable flash chamber 88. The heat exchanger 20 may include an outer tubular casing 102 surrounding conduit means 100 which interiorly of the casing 102 may branch into a plurality of spaced tubes providing a tube bundle. The relatively weak warmed absorbent solution leaving solution heat exchanger 19 is pumped through the conduit 100 of heat exchanger 20 in counterflow heat transfer relation with relatively warmer strong solution pumped through the heat exchanger casing 102 from conduit 90. The cooled strong solution then passes from casing 102 through conduit 104 to spray header 40 in absorber 14.

By pumping both the strong and weak solutions through the sensible-type heat exchanger 20, excellent overall heat transfer coefficients are obtained in the sensible heat exchanger, since both solutions are forced to flow at relatively high velocities, with the result that good scrubbing of the inner walls of the heat exchanger takes place. This is in contrast with prior arrangements in which the strong solution flows by gravity from the generator through the solution heat exchanger and thus moves at relatively low velocities. Further, by pumping the solution both to and from the generator, machine operation is relatively insensitive to ambient temperature conditions and possible startup problems.

In operation, liquid refrigerant drains into scoop pump 46 from evaporator 16 through conduit 48 and out from discharge nozzle 48a into the interior of pan 44 wherein it is centrifugally impelled outwardly. The refrigerant liquid is picked up by eduction orifice 50a and pumped to evaporator 16 through conduit 50. Liquid refrigerant, which drained to the bottom of the housing 42 during machine shutdown, is impelled into pick-up scoop 52 and passes to the interior of pan 44 to be pumped to the evaporator 16. Scoop 52 also returns any refrigerant that has splashed over during operation to the system to eliminate drag on the scoop pump.

At the same time, motor 54 causes pans 78 and 80 of scoop pumps 82 and 84 of flash-type solution heat exchanger 19 to rotate, and relatively hot strong solution drains through line 86 from generator 10 into rotatable flash chamber 88. The hot strong solution flashes in chamber 88 and the flash cooled liquid is pumped by eduction orifice 90a through conduit 90 to the interior of casing 102 of sensible-type heat exchanger 20 and through conduit 104 to spray header 40 in absorber 14. The refrigerant vapor formed by flashing of the strong solution in chamber 88 is absorbed by weak relatively cool solution in chamber 94 to dilute and raise the temperature thereof, while the temperature of the flash cooled strong solution is lowered and the solution is rendered more concentrated.

In the embodiment of the invention shown in FIG. 1, the sensible-type solution heat exchanger is located outside the latter heat exchanger. However, the sensible heat exchanger is disposed within the housing of the flash heat exchanger, as illustrated in FIG. 2.

Figure 2:
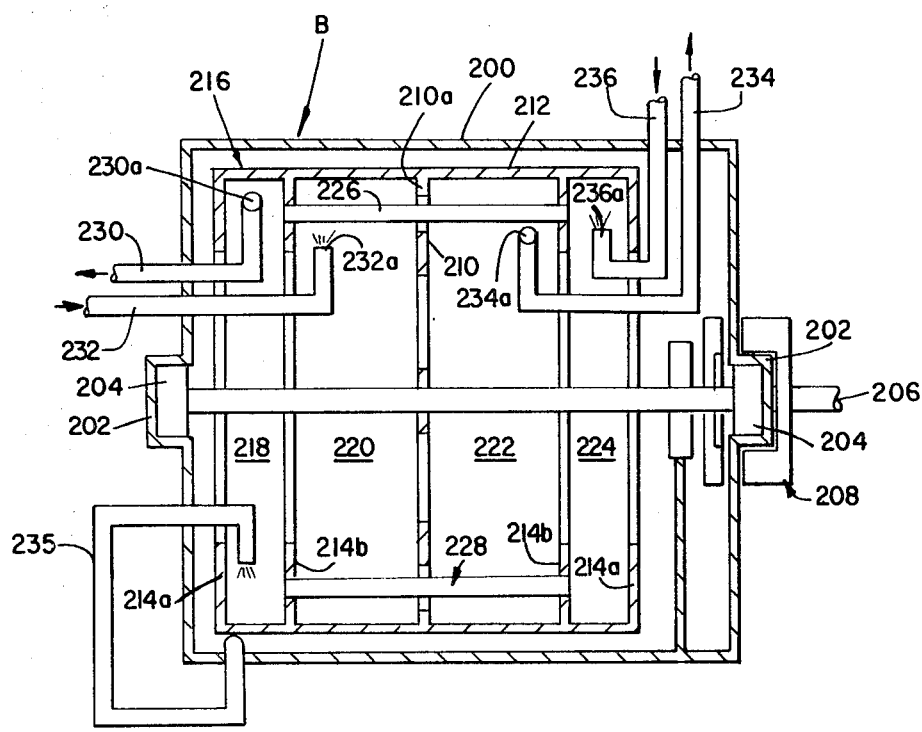
FIG. 2 is a side elevational view, with portions thereof taken in section, showing a modified embodiment in which the sensible-type solution heat exchanger is located interiorly of the flash-type solution heat exchanger.

Heat exchanger apparatus in FIG. 2 is designated generally therein by the legend B and comprises a stationary hermetic housing 200 formed at opposite ends with embossments 202 in which are seated bearing means 204 journaling shaft means 206 which is caused to rotate through magnetic drive means 208 actuated by a motor (not shown). Supported by the shaft 206 interiorly of the housing is a partition means 210 having a plurality of openings 210a therein, the partition being integral with an annular wall member 212 formed with a plurality of axially spaced, radially inwardly directed segmented wall portions 214a and 214b. The partition 210, wall member 212 and wall portions 214a and 214b define a flash-type solution heat exchanger designated generally by the numeral 216, and interiorly thereof provided by the mentioned wall structure are a plurality of communicating chambers referred to herein as a generator circulating chamber 218, generator flash chamber 220, absorber circulation chamber 222, and absorber flash chamber 224.

Passing through the outermost openings 210a in the central partition 210 and supported by the wall portions 214b are a plurality of axially extending circumferentially spaced tubular members 226. These members communicate at their opposite ends with chambers 218 and 224, and provide a sensible-type solution heat exchanger designated in its entirety by the numeral 228. Heat exchange tubes 226 may be replaced by one or more helical tubes extending between chambers 224 and 218 if desired.

Communicating also with generator circulation chamber 218 is eduction orifice 230a of conduit means 230 leading to generator 10 of FIG. 1 for transferring thereto weak relatively warm solution, and leading from the generator is conduit 232 having nozzle means 232a for discharging into flash chamber 220 strong relatively hot solution. Absorber circulation chamber 222 has disposed therein eduction orifice 234a of conduit means 234 for pumping from this chamber strong solution and transfering the same through conduit 234 to spray header 40 in absorber 14. Discharging into absorber flash chamber 224 through nozzle means 236a of conduit means 236 is relatively cool weak solution from absorber 14. A cleanup scoop 235 is provided to remove liquid from the bottom of housing 200. Refrigerant may be circulated in the system by apparatus such as identified by the numeral 18 in FIG. 1.

Operation of heat exchange apparatus B of FIG. 1 is as follows: Upon a rotative driving force being applied to shaft member 206, flash-type solution heat exchanger 216 and sensible-type solution heat exchanger 228 carried thereby are caused to rotate relative to housing 200 and the stationary conduits 230, 232, 234, and 236. Relatively hot strong absorbent solution from generator 10 is discharged through nozzle 232a into flash chamber 220, and flashes therein. The flash vapors are absorbed in cooler weak solution in chamber 224 and the strong solution warms the surfaces of the tubes 226 in chamber 220 of the sensible heat exchanger. The centrifugally rotating pool of flash-cooled strong solution passes through openings 210a in the partition member 210, and is scooped by the eduction orifice 234a in absorber circulation chamber 222 and pumped through conduit 234 to spray header 40 in absorber 14.

At the same time relatively cool weak solution from the absorber 14 is discharged from nozzle 236a of conduit 236 into absorber chamber 224 where it absorbs refrigerant vapor from chamber 220, thereby warming and diluting the weak solution. The weak solution flows from chamber 224 through the tubes 226 of the sensible heat exchanger 228 to chamber 218, and the weak solution is warmed by heat transfer in tubes 26 from the higher temperature strong solution which circulates around the tubes 26. The weak solution is scooped from generator circulation chamber 218 by eduction orifice 230a of conduit 230 and transferred to generator 10 for reconcentration therein.

The embodiment of the invention shown in FIG. 2 has, in addition to the advantages possessed by the arrangement FIG. 1, the characteristic of essentially avoiding solution crystallization in the event of machine shutdown, as may be occasioned by a power failure. It is readily apparent that should the machine stop, weak and strong heat exchanger and intermix to form a combined solution heat exchanger and intermix to form a combined solution having a concentration not susceptible to crystallization. In the structure of FIG. 2, the weak solution in the sensible heat exchanger will drain out from the opposite ends of the tubes 226.

In the arrangement of FIG. 1, with the sensible heat exchanger 20 located physically above the flash heat exchanger 19, there is adequate drainage of strong solution through the heat exchanger 20 so that no strong solution will remain therein for possible solidification. Should for some reason it be necessary to locate the heat exchanger 20 at the same level or below the heat exchanger 19, and solidification occurs in the sensible heat exchanger 20, normal means would be employed to desolidify the solution therein.

By this invention both weak and strong absorbent solutions are pumped to and from the generator, and thereby both the weak solution and strong solution side film coefficients are excellent since both solutions are froced to flow at relatively high velocities. Also, by so proceeding, machine operation is relatively insensitive to ambient conditions and possible start-up problems. Further, by intermixing the strong and weak solutions on machine shutdown, solution solidification is only a most remote possibility. Additionally, by combining a small sensible-type forced flow solution heat exchanger with a flash-type solution heat exchanger, whether or not the former is inside or outside the latter, the thermal efficiency of the flash heat exchanger is markedly improved.

Furthermore, this invention produces surprisingly better heat transfer than either a single stage flash heat exchange or a sensible heat exchanger, alone, by utilizing the flash heat exchanger to do the major portion of the work while employing a small, inexpensive sensible heat exchanger, with forced flow, to exchange heat between the effluent flash heat exchanger solutions. The capability of the rotary flash heat exchanger to perform the pumping operations required for this result without external pumps makes the arrangement especially attractive from an economic point of view.

Various changes and modifications may be made within the scope of this invention.

I claim:

1. An absorption refrigeration system comprising a generator for concentrating absorbent solution by vaporizing refrigerant therefrom to form strong absorbent solution; a condenser connected for condensing refrigerant vapor formed in said generator; an evaporator for evaporating the refrigerant liquid therein; an absorber connected to the evaporator for absorbing refrigerant vapor formed therein; and solution heat exchange means for transferring strong and weak solution in heat exchange relation to and from said generator and absorber, said solution heat exchange means comprising a rotary flash heat exchanger having a stationary housing and a pair of rotatable pans within said housing forming a strong solution flash chamber and a weak solution chamber; passage means for passing strong absorbent solution from the generator to the strong solution flash chamber; passage means for passing weak absorbent solution from the absorber to the weak solution chamber; said strong solution flash chamber being in communication with said weak solution chamber so that refrigerant vapor flashing from the strong solution in the strong solution flash chamber passes to the weak solution chamber and is absorbed into weak solution therein; strong solution eduction passage means disposed in said strong solution flash chamber for passing strong solution therefrom to said absorber; weak solution eduction passage means disposed in the weak solution chamber for passing weak solution therefrom to said generator; means for rotating said rotatable pans to pump absorbent solution therein through said eduction passage; and a sensible solution heat exchanger having a strong solution passage and a weak solution passage for exchanging heat between the strong and weak absorbent solutions.

2. An absorption refrigeration system as defined in claim 1 in which said sensible solution heat exchanger is located within the housing of said rotary flash heat exchanger and rotates with said pans.

3. An absorption refrigeration system as defined in claim 1 wherein the strong solution passage of said sensible solution heat exchanger is disposed in said strong solution eduction conduit and the weak solution passage of said sensible solution heat exchanger is disposed in the weak solution eduction passage.

4. A method of operating an absorption refrigeration system having a generator, a condenser, an evaporator, an absorber, a rotary flash-type heat exchanger having strong and weak solution eduction passages leading from rotatable pans therein, and a sensible-type heat exchanger, which comprises the steps of heating weak absorbent solution in the generator for vaporizing refrigerant therefrom to form strong absorbent solution; condensing the vaporized refrigerant and directing a portion of the refrigerant liquid to the evaporator and evaporating refrigerant liquid therein; transferring strong solution and weak solution to the flash-type heat exchanger to flash cool the strong solution and reduce the temperature thereof while absorbing in the weak solution the resulting flash vapors to warm the weak solution; rotating the pans in the rotary flash-type heat exchanger to impel the weak and strong solutions from their respective pans and through their respective eduction passages, thereby pumping strong and weak solutions through the sensible-type heat exchanger in heat exchange relation with each other; and passing the weak solution to the generator and the strong solution to the absorber.

5. A method of operating an absorption refrigeration system as defined in claim 4 including the step of passing the strong and weak absorbent from said flash-type heat exchanger in counterflow relation with each other through the sensible-type heat exchanger.

References Cited

UNITED STATES PATENTS

| 3,124,938 | 3/1964 | Leonard, Jr. | 62—476X |
| 3,389,574 | 6/1968 | McGrath | 62—476X |

WILLIAM F. O'DEA, Primary Examiner

P. D. FERGUSON, Assistant Examiner

U.S. Cl. X.R.

62—489; 415—89

UNITED STATES PATENT OFFICE
CERTIFICATE OF CORRECTION

Patent No. 3,608,326  Dated September 28, 1971

Inventor(s) LOUIS H. LEONARD, JR.

It is certified that error appears in the above-identified patent and that said Letters Patent are hereby corrected as shown below:

Column 5, line 36, "26" should read --226--

Column 5, line 37, "26" should read --226--

Column 5, line 47, "heat exchanger and intermix to form a combined solution" should read --solutions will both drain down into the flash-type solution--

Column 5, line 66, "froced" should read --forced--

Signed and sealed this 23rd day of May 1972.

(SEAL)
Attest:

EDWARD M. FLETCHER, JR.          ROBERT GOTTSCHALK
Attesting Officer                Commissioner of Patents